United States Patent [19]

Albert

[11] 4,288,697

[45] Sep. 8, 1981

[54] LAMINATE RADIATION COLLIMATOR

[76] Inventor: Richard D. Albert, 317 Hartford Rd., Danville, Calif. 94526

[21] Appl. No.: 35,733

[22] Filed: May 3, 1979

[51] Int. Cl.[3] .......................... G02B 5/00; G21K 1/00; H01J 1/52

[52] U.S. Cl. ................................ 250/505; 250/445 T; 250/503

[58] Field of Search ............... 250/483, 486, 503, 504, 250/505, 510, 401, 445 T, 508

[56] References Cited

U.S. PATENT DOCUMENTS

| | | | |
|---|---|---|---|
| 2,624,013 | 12/1952 | Marks | 250/505 |
| 2,638,554 | 5/1953 | Bartow et al. | 250/505 |
| 2,730,566 | 1/1956 | Bartow et al. | 250/503 |
| 3,227,880 | 1/1966 | Wideröe | 250/505 |
| 3,373,286 | 3/1968 | Han | 250/505 |
| 3,793,520 | 2/1974 | Gremier | 250/505 |
| 3,867,637 | 2/1975 | Braun et al. | 250/505 |
| 3,869,615 | 3/1975 | Hoover et al. | 250/510 |
| 3,949,229 | 4/1976 | Albert | 250/401 |
| 4,144,457 | 3/1979 | Albert | 250/445 T |

*Primary Examiner*—Bruce C. Anderson
*Attorney, Agent, or Firm*—Phillips, Moore, Weissenberger, Lempio & Majestic

[57] ABSTRACT

A collimator (21, 38, 38A) transmits intercepted X rays or the like along an array of predetermined spaced apart paths (22, 22A), which may be parallel or convergent, while absorbing intercepted radiation which is traveling in other directions. A laminated construction of the collimator provides for an extremely large number of very minute and closely spaced radiation passages (42, 42A) which may have a noncircular cross section to increase transmissivity. The laminated construction also reduces the amount of heavy and sometimes costly radiation absorbent material required in the collimator, enables precise control of the transmitted radiation paths and facilitates the establishing of a desired focal point for the paths. Photoetching techniques, including optical image reduction, are used in the manufacture of the collimator laminations. In some variations of the method, the radiation absorbent material is plated onto the laminations.

12 Claims, 15 Drawing Figures

LAMINATE RADIATION COLLIMATOR

TECHNICAL FIELD

This invention relates to collimators for transmitting intercepted radiation along a plurality of predetermined paths while suppressing intercepted radiation which is traveling in other directions.

BACKGROUND OF THE INVENTION

In systems which utilize higher frequency electromagnetic radiations such as X rays, gamma radiation or the like, it is often necessary to directionalize a radiation flux that is initially composed of rays traveling in diverse different directions. This cannot be accomplished with refractive lenses, reflective mirrors or the like as in the case of the optical band of frequencies. Instead, it is necessary to employ a collimator which is basically a body of radiation absorbent material transpierced by one or more radiation transmissive passages. When placed between the radiation source and the device or subject to which radiation is to be transmitted, the collimator absorbs intercepted radiation other than intercepted radiation which is traveling along paths coincident with the passage or passages of the collimator.

The operation of certain forms of radiation utilizing system may be enhanced by employing collimators having structural characteristics that are difficult to realize by using known construction techniques, such as by simply drilling the desired passages through a block or plate of radiation absorbent material. One example of such a system is described in prior U.S. Pat. No. 3,949,229, issued Apr. 6, 1976, to the present applicant and entitled, X-RAY SCANNING METHOD AND APPARATUS.

The above identified prior patent discloses a radiographic system for producing an instantaneous X-ray image of a subject on the screen of a display device such as a television receiver set. An X-ray source at one side of the subject generates a moving X-ray origin point which is swept along successive scan lines of a raster pattern area on a broad anode plate. At least one radiation detector, of very small size in relation to the raster area of the source, is situated at the other side of the region to be imaged. The raster sweep frequencies of the display device are synchronized with those of the X-ray source and the electron beam intensity of the display device is modulated by the output of the radiation detector to generate the radiographic image on the screen of the display.

The above described system of prior U.S. Pat. No. 3,949,229 preferably employs a broad multiple apertured collimator situated between the X-ray source and the subject. To be most effective, the collimator should have an extremely large number of very small and closely spaced radiation passages which in some cases should be convergent so that each passage is directed toward the small radiation detector at the other side of the subject. A collimator with such characteristics has several beneficial effects in a radiographic system of the kind described above. Radiation dosage of the subject, which may be a medical or dental patient, is greatly reduced since the collimator suppresses radiation from the source that is traveling in the general direction of the subject but which is not directed at the small detector and which therefore could not contribute useful information to the image. The collimator also enhances image clarity by reducing secondary X-ray production at random origin points within the subject. Such secondary X rays can otherwise introduce spurious data into the image.

Similar collimators having a very large number of minute radiation passages are useful in a variety of other radiation systems, another example of such a system being described in prior U.S. Pat. No. 4,144,457 entitled, TOMOGRAPHIC X-RAY SCANNING SYSTEM, issued Mar. 13, 1979, to the present applicant.

Structural characteristics of the collimator have a pronounced effect on the performance of X-ray systems of the kind discussed above. Definition and clarity of the image is in part a function of the number of radiation passages which can be provided per unit area of the collimator. Providing of a greater number of passages per unit area in turn dictates that passage size be reduced. For example in some systems, it would be desirable to provide as many as one hundred passages per linear centimeter of collimator surface with cross-sectional passage dimensions of the order of 25 microns. As a practical matter, prior collimator construction methods are incapable of realizing such parameters.

In many circumstances the performance of such a collimator is also dependent on maximizing transmissivity which is the ratio of intercepted radiation, which is traveling in the desired directions, that is transmitted through the collimator as opposed to being absorbed. Maximizing transmissivity is dependent on the degree to which the spacing between the radiation passages of the collimator can be minimized. It is also in part dependent on the cross-sectional configuration of the passages. Circular cross-sectioned passages, such as produced by conventional drilling methods for example do not maximize transmissivity. Passages of polygonal cross section would be more effective for this purpose. The difficulties of producing passages of noncircular cross-sectional configuration by known techniques greatly increases if the passages are to be of minute cross-sectional area as discussed above.

Using prior collimator constructions and fabrication techniques it is also very difficult to control the alignments of many small passages with the desirable degree of precision and again this problem is aggravated to the extent that the number of passages per unit area is increased and the size of each individual passage is reduced.

For optimum collimator performance, each individual passage should establish a radiation path having a precise predetermined orientation relative to the paths established by each of the other passages. Achieving this precision can be difficult in the manufacture of collimators in which the passages are intended to be parallel and the problems are still more pronounced in the manufacture of focusing collimators. Focusing collimators have passages which are convergent towards a single distant focal point. Thus in collimators of this particular kind no two of the extremely large number of minute passages have exactly the same orientation in the collimator but the differences in the orientation of adjacent passages may be very slight. If a series of focusing collimators, each having a different focal length, are to be manufactured, the problems of obtaining precision in the orientation of the passages are compounded.

Conventional collimator constructions often also result in an undesirably costly product in that more of the radiation absorbent material is present in the collimator, to provide structural integrity, than is actually needed strictly from the standpoint of performing the collimating function. Such materials are typically heavy metals some of which are relatively costly. A related factor is that the inclusion of more heavy radiation absorbent material than is actually needed to achieve the collimating function increases the weight of the collimator. In some systems, such as certain forms of the apparatus disclosed in applicant's copending application, Ser. No. 35,437, filed May 3, 1979 and entitled, IMAGE REGION SELECTOR FOR A SCANNING X-RAY SYSTEM, it is preferable that the weight of the collimator be minimized.

While the problems encountered with prior collimator constructions and methods of manufacture have been discussed above primarily with reference to scanning X-ray systems, similar collimator problems are also encountered in other apparatus. For example in more conventional radiographic procedures for medical or dental purposes or the like X rays are produced at a fixed origin point in an X-ray tube and travel, through the region of the patient to be examined, to a relatively broad film or florescent screen. Image degradation from X-ray scattering and secondary X-ray production is also a problem in this type of X-ray procedure since data imparted to the film or screen by X rays which do not travel directly from a fixed point in the X-ray tube to the film or screen is spurious data as far as the image is concerned. To reduce image degradation from this cause, it is a common practice to dispose an antiscatter grid, commonly referred to as a Bucky grid, between the subject and the film or screen.

Such Bucky grids are essentially multiply apertured collimators of the kind discussed above. The Bucky grid contains an array of small passages which transmit radiation that travels towards the film or screen along direct lines radiating from the origin point in the X-ray tube while the solid material of the grid absorbs X rays which arrive from other directions. Certain of the limitations of prior collimator constructions and construction methods as discussed above are also applicable to Bucky grids. Using prior constructions, aperture size is often sufficiently large and aperture density is often sufficiently low that an image of the grid itself is apparent in the desired X-ray image. The superimposed grid image may obscure the desired image to a significant extent. Radiographic equipment and procedures are often complicated by measures designed to minimize this problem. For example, it is a common practice to oscillate the Bucky grid during the exposure by acoustically induced vibration for example, in order to obscure the outline of the grid in the image.

The foregoing discussion of prior collimators and collimator manufacturing procedures has, for purposes of example, been primarily directed to collimators for X-ray systems. Similar collimators are used and similar problems are encountered in systems which utilize other types of high frequency radiation. For example, radioactive sources emitting gamma radiation or other wavelengths are sometimes employed in radiographic systems or the like which require collimators of the general kind discussed above.

DISCLOSURE OF THE INVENTION

The present invention is directed to overcoming one or more of the problems as set forth above.

In one aspect of this invention a radiation collimator defines a plurality of spaced apart radiation transmissive paths separated by radiation absorbent regions for suppressing intercepted radiation other than intercepted radiation which is traveling along the plurality of paths. The collimator is comprised of a plurality of collimating laminations each of which extends across the plurality of paths and each of which is formed at least in part of radiation absorbent material transpierced by a plurality of spaced apart radiation transmissive passages, corresponding ones of the passages of each of the collimating laminations being aligned to establish the radiation paths through the collimator.

In another aspect of the invention, radiolucent spacer laminations are disposed between the collimating laminations.

In another aspect of the invention, which provides a focusing collimator having radiation passages which are convergent towards a focal point, corresponding radiation passages of successive ones of the collimating laminations are confined to a progressively smaller area of each successive lamination and are of progressively smaller size and closer spacing at each successive lamination.

A method of manufacturing a radiation collimator includes the steps of forming a plurality of collimating laminations at least in part of radiation absorbent material including forming a plurality of spaced apart radiation transmissive passages in the radiation absorbent material of each of the collimating laminations, and assembling the collimating laminations to form a laminate collimator including aligning corresponding ones of the passages of the plurality of collimating laminations to form a plurality of spaced apart radiation transmissive paths through the collimator.

In still another specific aspect, an embodiment of the invention provides for manufacture of a laminated radiation collimator by photoetching steps which may include optical image reduction procedures to produce an extremely large number of minute and closely spaced radiation passages per unit area of collimator surface.

By utilizing photoetching techniques of the general kind heretofore used in the solid state electronics industry to fabricate integrated microcircuit elements, a series of thin collimating laminations may be formed which have an extremely large number of very minute and closely spaced radiation passages that need not necessarily have a circular cross-sectional configuration. Assembly of such laminations with corresponding passages in alignment provides a collimator which may be used in radiographic systems to increase image definition and clarity and to reduce radiation dosage of a subject and which may be used for other radiation collimating purposes as well.

By utilizing photoetching steps including progressively greater optical image reduction in the fabrication of the successive collimating laminations, focusing collimators having precisely oriented convergent passages may readily be formed. By disposing spacer laminations between the collimating laminations, the collimator may be formed with relatively smaller quantities of the sometimes heavy and/or costly radiation absorbent material and the spacer laminations also enable manufacture of a series of focusing collimators of different focal lengths utilizing similar sets of collimating laminations.

Thus, depending on the criteria which are desirable in the particular usage to which a specific collimator is to be put, aspects of the invention variously enable increased aperture density, increased transmissivity, increased image definition and clarity in radiographic systems, reduced radiation dosage of subjects, more precise control over the orientations of plural radiation passages in collimators and reduced collimator weight and cost.

BEST MODES OF PRACTICING THE INVENTION

Figure 1:
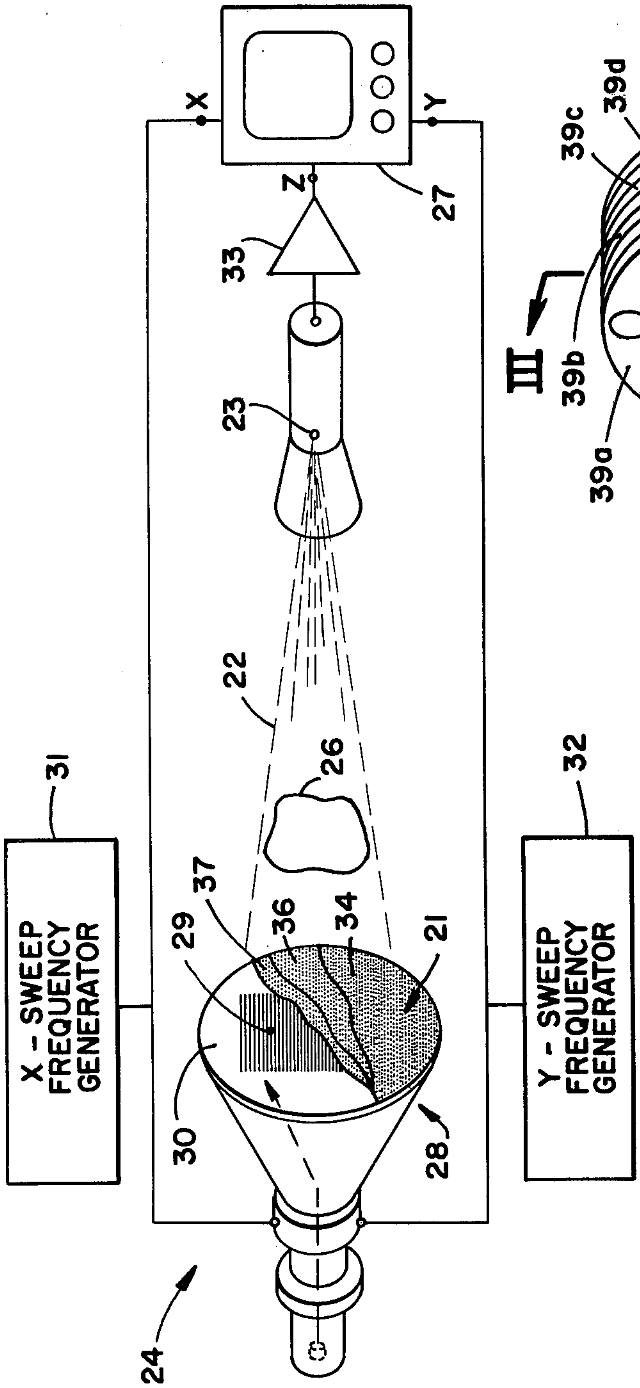
FIG. 1 is a perspective view of a radiation focusing collimator embodying the invention as employed in a scanning X-ray system for producing a radiographic image.

Referring initially to FIG. 1 of the drawing, a radiation collimator 21 of the general type to which the invention is applicable defines a plurality of spaced apart radiation transmissive paths 22 and functions to absorb and suppress intercepted radiation other than the intercepted radiation which is traveling along the specific paths 22. In the particular example depicted in FIG. 1, the radiation paths 22 are convergent towards a focal point defined by a small radiation detector 23 and thus the collimators 21 is of the focusing type. The laminate construction may also be adapted to nonfocusing collimators having parallel radiation paths as will hereinafter be discussed in more detail.

Collimators 21 of this general type may be employed in a variety of systems of which the scanning X-ray radiographic system 24 depicted in FIG. 1 is one example. Scanning X-ray system 24 is of the form disclosed in prior U.S. Pat. No. 3,949,229 issued Apr. 6, 1976 to Richard D. Albert for X-RAY SCANNING METHOD AND APPARATUS and produces instantaneous radiographic images of a subject 26 such as a medical patient, dental patient or an inanimate object on the screen of a cathode ray display tube such as a television receiver set 27. Such a system has an X-ray source 28 generating a moving X-ray origin point 29 which is swep through successive scan lines of a raster pattern on a broad anode plate 30 by X- and Y-sweep frequency generators 31 and 32 respectively. The sweep frequencies of television receiver set 27 are synchronized with those of the X-ray source 28 and the electron beam intensity of the receiver set is modulated by the output signals of radiation detector 23 through an amplifier 33 to produce the visible image of internal regions of the subject 26.

X rays are emitted from the moving origin point 29 in all directions but only the relatively small proportion that are emitted towards the detector 23 can contribute useful information to the image. Consequently, the collimator 21 is disposed between the X-ray source 28 and the subject 26 to absorb intercepted X rays other than X rays which are traveling in a direct line from origin point 29 to detector 23. This reduces unproductive radiation dosage of the subject 26 and also enhances image clarity by reducing secondary X-ray emission at random points within the subject.

As previously discussed in more detail, the effectiveness of the collimator 21 in usages such as that described above is increased if a very large number of passages of very small cross-sectional dimensions and of very close spacing are present in the collimator to establish the radiation paths 22. Such passages should also be precisely oriented so that all passages are accurately directed towards the focal point. In many cases it is preferable that the passages have a noncircular cross-sectional configuration and in some usages it is important that weight be minimized. In order to best realize these objectives, the collimator 21 has a laminate structure of which three of the component laminations 34, 36 and 37 are visible in FIG. 1 although more laminations are actually present in a typical collimator.

Significant structural details of a typical collimator 21 for the above described usage cannot readily be illustrated in a drawing of the scale of FIG. 1 because of such factors as the number and small thickness of the component laminations and the presence of an extremely large number of very minute and closely spaced radiation passages. In order to illustrate such detail clearly, all subsequent Figures depict collimators, such as collimator 38 of FIGS. 2 and 3, which have a relatively small number of relatively thick laminations and which have relatively few radiation passages of abnormally large size in comparison with a typical collimator for systems of the kind depicted in FIG. 1.

Figure 2:
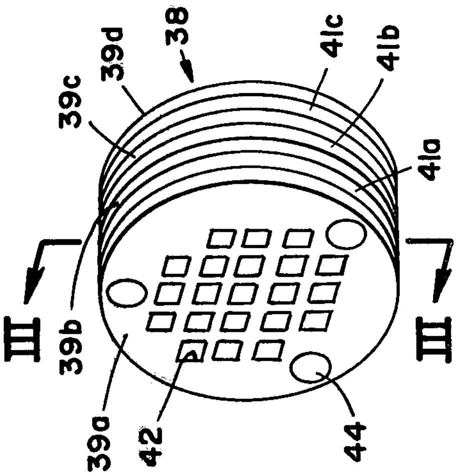
FIG. 2 is a perspective view of a second radiation focusing collimator having thicker laminations and larger radiation passages than is typical in order to best illustrate the laminate construction.
Figure 3:
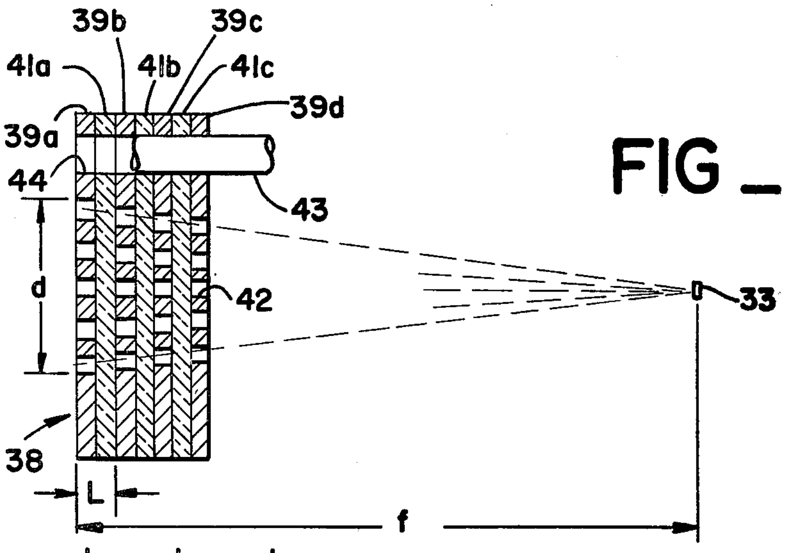
FIG. 3 is a section view of the collimator of FIG. 2 taken along line III—III thereof.

Referring now to FIGS. 2 and 3 in conjunction the collimator 38 is formed of a series of collimating laminations 39*a*, 39*b*, 39*c*, 39*d* each of which is formed at least in part of a radiation absorbent material such as lead, tin, or molybdenum among other examples. The collimating laminations 39*a* to 39*d* are alternated with spacer laminations 41*a*, 41*b*, 41*c* which establish the focal length of the collimator as will hereinafter be discussed in more detail. Spacer laminations 41*a* to 41*c* are formed of a radiolucent material which in some cases may be a lightweight radiation transmissive metal, such as aluminum, but manufacture of the collimator is facilitated if the spacer laminations are formed of an optically transparent material, such an any of various clear plastics, for reasons which will be hereinafter discussed.

The initial collimating lamination 39*a* of the collimator 38 has rows of spaced apart radiation passages 42 except at the radially outermost portion of the lamination, the diameter of the area in which the radiation passages are provided being designated in FIG. 3 by the letter (d). The term "radiation passages" as used herein and in the appended claims should be understood to refer to regions of the collimating laminations which transmit radiation without attenuation or with substantially less attenuation than the surrounding regions. Such radiation passages need not necessarily be open space provided that such physical obstructions as are present are formed of radiation transmissive materials.

The transmissivitiy of the collimator 38, i.e. the proportion of the intercepted X rays which are traveling towards the focal point, that are transmitted through the collimator instead of being absorbed, is increased if the passages 42 have a noncircular cross-sectional configuration, the passages having a square cross section in this example although other polygonal configurations are also suitable. The noncircular passage 42 configuration also reduces weight.

Each succeeding collimating lamination, of which there are three, 39*b*, 39*c*, and 39*d* in this particular example, has a similar number of similarly shaped radiation passages 42 except that the diameter (d) of the area occupied by the passages is progressively smaller at each successive one of the collimating laminations and the passages of each successive lamination are of progressively smaller cross-sectional area and spacing. This progressive decrease of the size of diameter (d) of the area at which the passages 42 are situated in each succeeding collimating lamination 39*a* to 39*d* is selected to cause corresponding ones of the passages of successive ones of the laminations to be aligned along an individual one of the ray paths 22 which ray paths converge at the distant focal point defined, in this instance, by the position of the previously described small radiation detector 23.

More specifically, if the area of first collimating lamination 39*a* which contains the array of passages 42 has a diameter (d), then the reduced diameter ($d_2$) of the passage containing area of the second collimating lamination 39*b* may be determined by the relationship: $d_2=d(f-L)/f$ where (f) is the focal length of the collimator measured from the outer surface of the first collimating lamination 39*a* to detector 23 and where (L) is the combined thickness of one collimating lamination 39*a* and one spacer lamination 41*a*. In general, the n'th collimating lamination will have a mesh diameter $d_n=d(f-nL+L)/f$. The aperture density ($M_n$), which is the number of passages 42 per unit length along a diametrical line on the n'th collimating lamination, is given by the relationship $M_n=Mf/(f-nL+L)$ where (M) is the aperture density of the first of the collimating laminations 39*a*.

To maintain the laminations 39*a* to 39*d*, 41*a* to 42*c* together, with the radiation passages 42 of successive collimating laminations in alignment along the convergent ray paths 22, pins or bolts 43 extend through bolt holes 44 which transpierce the outer portions of the laminations at locations outside the region of passages 42. Adhesives or other fastening means may also be used to secure the laminations together.

As previously pointed out the collimator 38 has, in order to show significant detail, been depicted in FIGS. 2 and 3 with untypical proportions and with an untypically small number of unusually large passages 42 and the collimator 38 of this example also has a smaller number of laminations than is normally present. In practice, a typical collimator for the previously described scanning X-ray system may have about 40 collimating laminations 39 each of only about 25 microns to 125 microns thickness, the overall thickness of the collimator 38 including the spacer laminations 41 being only about 0.5 cm. The diameter of the apertured area (d) on the initial collimating lamination 39 is determined by the breadth of the received X-ray flux and may for example be 10 cm. as dictated by the dimensions of the equipment, such as the previously described X-ray source, with which the collimator is used. Radiation passages 42 at the initial collimating lamination 39 may hve widths as small as the thickness of the lamination or about 25 to 125 microns for example and aperture density may in some cases be of the order of about 100 passages 42 per linear centimeter of collimator surface at the initial collimating lamination. The foregoing dimensions are for purpose of example and should not be considered to be limitative.

The spacer laminations 41 are provided in the collimator 38 in instances where it is desired to establish a specific overall collimator thickness, to assure that transmitted radiation is closely confined to the desired ray paths 22, without utilizing more of the sometimes heavy and costly radiation absorbent material of the collimating laminations 39 than is required strictly for the purpose of absorbing radiation which is to be suppressed. The spacer laminations 41 are also utilized in instances where it is desired to manufacture a series of collimators 38 of different predetermined focal lengths (f) as use of the spacer laminations enables substantial manufacturing simplifications and economies.

Figure 4:
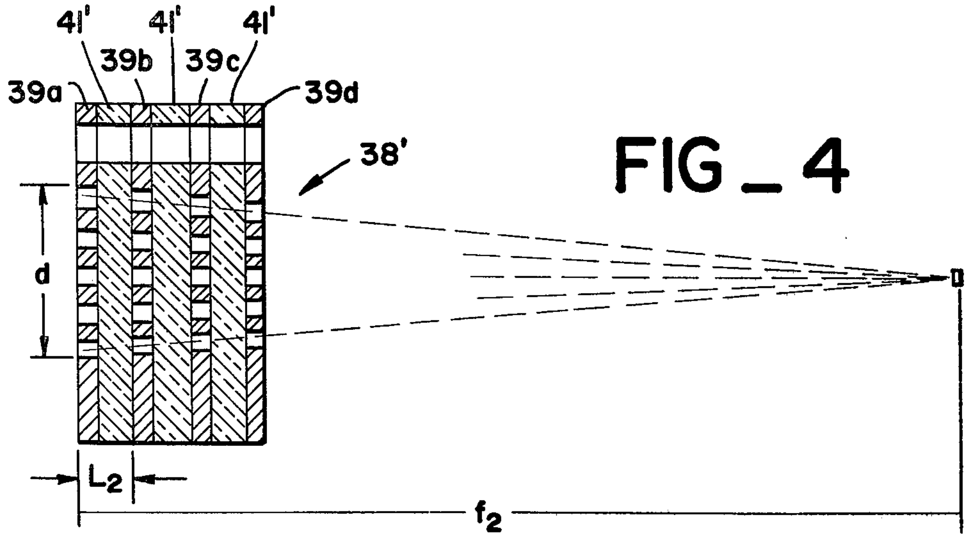
FIG. 4 is a sectional view of a collimator having certain elements similar to those of FIG. 3 but including modifications which establish a different focal length.

In particular, identical sets of collimating laminations 39*a*, 39*b*, 39*c*, 39*d* may be used to assemble collimators of different focal lengths simply by changing the thickness of the spacer laminations 41' as illustrated in FIG. 4. The collimator 38' of FIG. 4 differs from that described above with reference to the preceeding figures only in that the spacer laminations 41' are of greater thickness. This results in a longer focal length ($f_2$) than was the case in the previously described embodiment. The necessary spacer lamination 41' thickness to achieve a desired focal length (f) may be determined from the mathematical equations set forth above, the spacer lamination thickness being the factor (L) minus the thickness of an individual one of the collimator laminations 39*a* to 39*d*.

Figure 5:
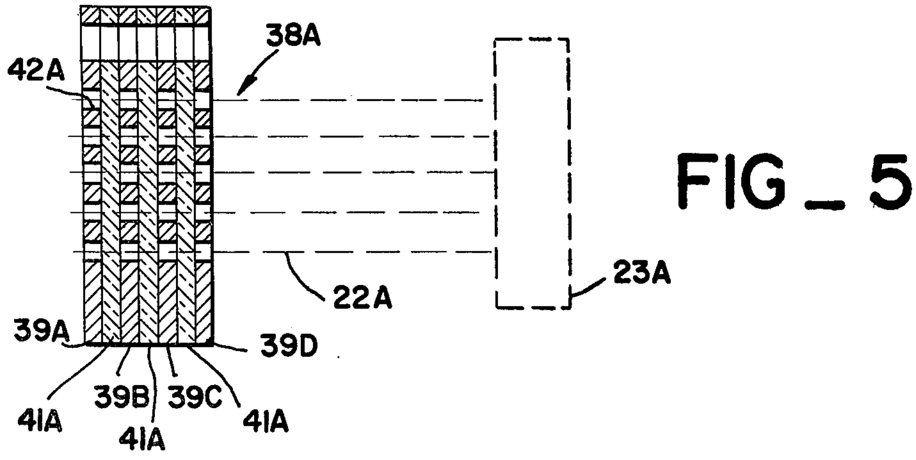
FIG. 5 is a section view of still another laminate collimator of the general kind depicted in the preceding figures and illustrating the adaptation of the laminate construction to nonfocusing collimators.

FIG. 5 illustrates an adaptation of the laminate construction to a nonfocusing collimator 38A which establishes transmitted ray paths 22A that are parallel rather than being convergent. A nonfocusing collimator 38A may be employed, for example, in a scanning X-ray system of the general type previously discussed but which has a radiation detector 23A that is at least as broad as the radiation transmitting region of the collimator 38A itself.

The nonfocusing collimator 38A of this example has collimating laminations 39A, 39B, 39C, 39D, alternated with spacer laminations 41A which are similar to the corresponding components of the collimator of FIG. 3 except insofar as all of the collimating laminations of the nonfocusing collimator 39D of FIG. 5 have similarly located radiation passages 42A of similar size rather than having progressively smaller passages confined to a progressively smaller area as in the previously described embodiments.

Considering now a practical and economical method for manufacturing the laminate collimators with a large number of closely spaced minute radiation passages, this may be accomplished with a form of chemical milling process of the general type heretofore more typically used in the electronic industry for the production of printed circuit elements. Basically, the radiation passage patterns in successive ones of the laminations are produced by photoetching using photographic negatives which, in the case of focusing collimators, are of progressive degrees of image reduction.

Manufacture of the collimator 38 of FIGS. 2 and 3 will be described for purposes of example.

Figures 6, 7, 8, 9, 10, 11, 12:
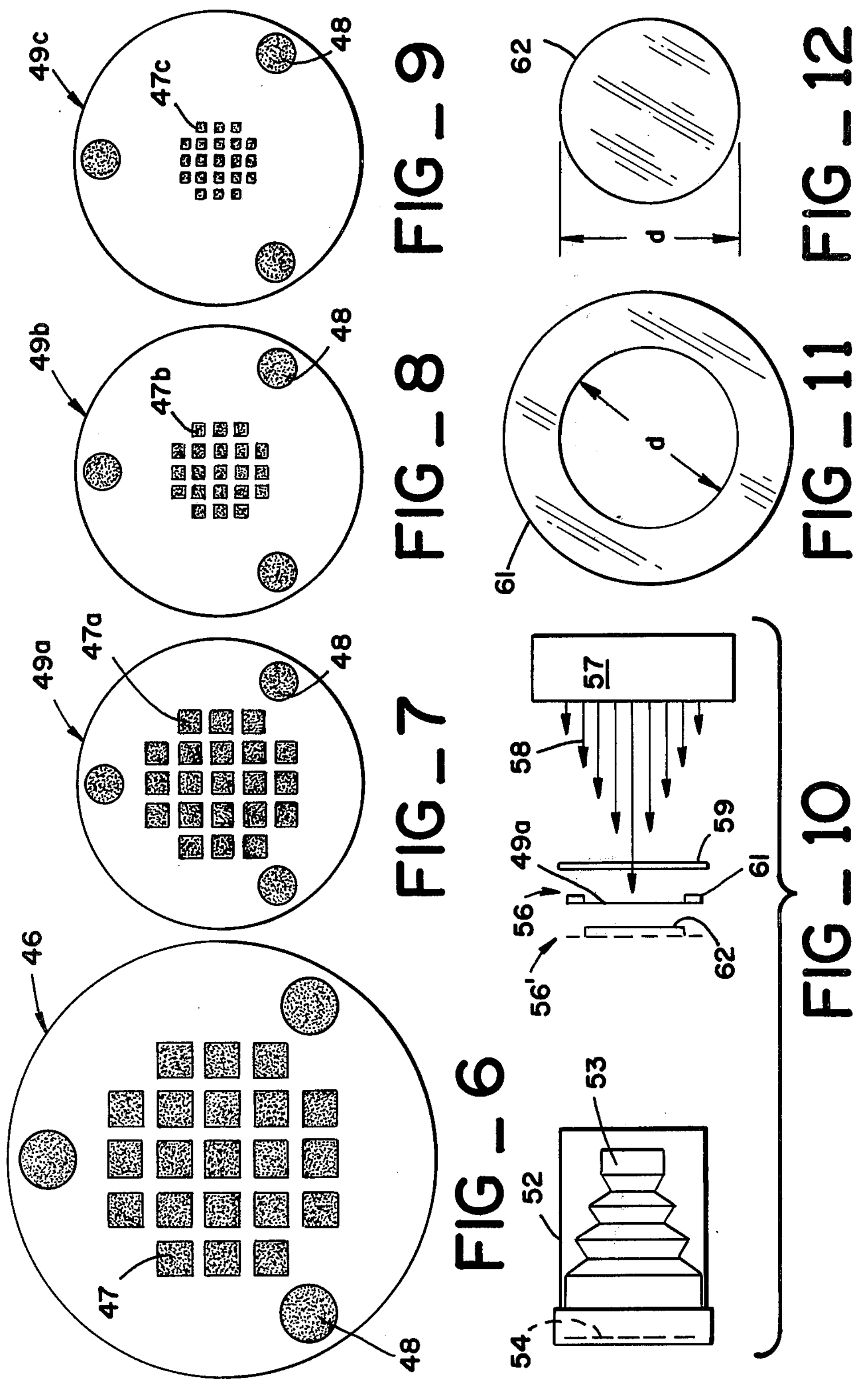
FIG. 6 depicts a pattern used in the manufacture of collimators of the type depicted in FIGS. 2 to 4.
FIGS. 7, 8 and 9 respectively depict the first, second and third of a series of photographic negatives used in manufacture of the successive laminations of the collimator of FIGS. 2 to 4.
FIG. 10 is a schematic illustration of a first method for producing the photograhpic negatives of FIGS. 7 to 9.
FIG. 11 illustrates a first mask used in the method of FIG. 10.
FIG. 12 illustrates a second mask used in the method of FIG. 10.

Referring initially to FIG. 6, a pattern 46 of the desired radiation passage areas 47 and alignment bolt holes 48 for the initial collimating lamination is prepared by any of several techniques. For example, an ink drawing may be prepared on which the positions of the passage areas 47 and alignment bolt holes 48 are represented by inked areas on paper of contrasting color. Alternately, pieces of tape conforming in shape with the desired passage areas 47 and alignment bolt holes 48 may be adhered to a sheet of paper or other material of contrasting color. Still another procedure for preparation of the pattern 46 is to photograph an object which already has a configuration conforming to the desired pattern. Certain commercially available electroformed meshes, for example, which are used as fluid filters have a pattern of apertures corresponding to what is required for certain radiation collimators.

As in the previous figures, the pattern 46 is depicted in FIG. 6 with much fewer but larger radiation passage areas 47 than is usually desired as it is not possible on the scale of the drawing to show the more typical pattern of minute, closely spaced noncircular apertures. Inking of the pattern of passage areas 47 in pen and ink form on paper or preparation of the pattern 46 by other procedures is not difficult as the pattern 46 may be much larger than the actual initial collimating lamination to which the pattern configuration will be transferred. In this particular example, the area 47 and 48 to be occupied by passages and alignment holes on the initial collimating lamination are represented by dark areas with the other portions of the pattern surface being light colored. Alternately light areas 47 and 48 may be provided on a dark background as either ordinary photographic negatives or reversal negatives may readily be prepared for the subsequent steps of the process depending on which type of pattern 46 is prepared.

Pattern 46 is then photographed and photographically reduced in size in the process to produce an initial negative 49*a*, depicted in FIG. 7, which will be used to photoetch the first collimating lamination 39*a* of FIGS. 2 and 3. Referring again to FIG. 7, in the form of the method to be initially described, the negative 49*a* has opaque areas 47*a* corresponding to the desired locations of the radiation passages, the areas 47*a* being situated in a light transmissive background corresponding to the radiation absorbent areas of the collimator lamination. Thus negative 49*a* is made by preparing a reversal negative of an initial negative of the pattern 46 of FIG. 6.

The initial negative 49*a* of FIG. 7 is then photographed and processed to produce a second reversal negative 49*b*, depicted in FIG. 8, at which the region occupied by the passage image areas 47*b* and the size of each such area 47*b* as well have been photographically reduced. As will hereinafter be described, the second negative 49*b* is utilized to photoetch the second collimating lamination 39*b* of FIG. 3. A series of additional negatives is then produced, such as third negative 49*c* depicted in FIG. 9, in which the area containing the passage image areas 47*c* is progressively reduced in accordance with the previously given mathematical relationship. Each of the series of negatives, such as negatives 49*a*, 49*b*, 49*c*, have the same diameter which conforms with the diameter of the collimator itself, but the area occupied by the radiation passage image areas 47*a*, 47*b*, 47*c* on the successive negatives is progressively reduced. The outer regions of the successive negatives 49*a*, 49*b*, 49*c*, where the alignment bolt hole images 48 appear, is not reduced in making the successive negatives so that the location and size of the hole image areas remains constant through the series of negatives. A technique for progressively reducing the central portions of the negatives while maintaining the outer portions containing the alignment hole image areas 48 of constant size is hereinafter described.

FIG. 10 illustrates one procedure for producing the series of additional negatives, such as negatives 49*b* and 49*c* of FIGS. 8 and 9 respectively, by repetitively photographing the initial negative 49*a* of FIG. 7 at progressively greater degrees of photoreductions. The procedure of FIG. 10 utilizes a camera 52 equipped with a variable focal length lens 53, commonly referred to as a zoom lens, of the kind which is adjustable to selectively change the size of the image, at the camera film plane 54, of an object situated at a fixed object plane 56 and which maintains the object in focus at the film plane as focal length is changed.

A broad light source 57 preferably of the type which emits substantially parallel light rays 58 is positioned to direct light of uniform intensity towards the camera 52 through a ground glass screen 59 or other light diffusing element situated between the object plane 56 and the light source 57.

FIG. 10 depicts the above described initial negative 49*a* of FIG. 7 positioned at the object plane 56 in preparation for an exposure by camera 52 which will produce a reduced negative at the camera image plane 54. To accomplish the desired degree of photoreduction, the variable focal length lens 53 of the camera is adjusted in accordance with the previously given image diameter reduction equation to produce an in focus image at film plane 54 having a diameter ($d_2$) equal to $d(f-L)/f$, the factors (d), (f) and (L) having been hereinbefore defined. Following the exposure, a reversal negative of this reduced negative is then prepared and is the negative 49*b* of FIG. 8 that is used for photoetching the second collimating lamination 39*b* of FIG. 3.

After the reduced negative 49*b* of FIG. 8 has been prepared in the above described manner, the exposure procedure of FIG. 10 is repeated, again using the initial negative 49*a* as the object but with lens 53 adjusted to produce an image at film plane 54 having a diameter ($d_3$) equal to $d(f-2L)/f$, to produce a negative from which another reversal negative may be made to constitute the third negative 49*c* of FIG. 9. Further repetitions of this exposure procedure, at progressively greater degrees of photoreduction are then used to produce the negatives for the subsequent collimator laminations.

It is preferable to etch the radiation passages of the successive collimating laminations inward from both sides of each lamination to produce passages of more uniform corss-sectional dimensions. Where this is to be done, a pair of each of the negatives, 49*a*, 49*b*, 49*c*, is produced for each collimating lamination. Preferably the second negative of each pair is prepared as a mirror image of the first negative of the pair, so that the pair of negatives may be disposed against opposite surfaces of a lamination blank which is to be photoetched with both negatives having the emulsion side against the blank.

Such use of mirror imaged but otherwise identical paired negatives results in radiation passages 42 which, as may be seen in FIG. 3, are essentially parallel and of nominally constant diameter within any individual one of the collimating laminations 39 although the radiation paths through the collimator 38 as a whole are convergent and of diminishing diameter. In other words, the size and spacing of the radiation paths diminishes in steps with each successive collimating laminations constituting a step. In instances where the small gain in radiation transmissivity justifies the process complication, this stepped radiation path configuration can be eliminated and the passages 42 can be made to be convergent and of diminishing cross section within each individual collimating lamination. This can be accomplished by photoreducing the second of the pair of negatives used in the photoetching of each lamination relative to the first of the pair of negatives in accordance with the above discussed relationships.

In instances where the alignment bolt holes 44 of FIG. 3 are also to be etched into the laminations, a double exposure of each negative is made at camera 52 of FIG. 10 using opaque masks depicted in FIGS. 11 and 12, in order to maintain the bolt hole image areas of constant size and location on each successive negative while the radiation passage image areas become of progressively smaller size and spacing. First mask 61 of FIG. 11 is annular and has an outside diameter conforming to that of the collimator and an inside diameter larger than the area (d) to be occupied by the array of radiation passages on the first collimator lamination of the series. Referring again to FIG. 10, during the initial one of the double exposures described above, the opaque annular first mask 61 is placed against the object negative 49*a* on the side towards the light source 57, so that only the central region of the negative is photographed during that initial exposure.

The second mask 62 of FIG. 12 is a circular, opaque disc having a diameter corresponding to the inside diameter of the first mask 61. Referring again to FIG. 10, prior to the second exposure of the double exposures, first mask 61 is removed and second mask 62 is disposed against the object negative 49*a* on the side facing the light source 57 so that during the second of the two exposures, only the outer region of the negative 49*a* containing the bolt hole images 48 shown in FIG. 7 is photographed. Referring again to FIG. 10, the second exposure of the double exposures, with second mask 62 in place, is not made with lens 53 adjusted for photoreduction. Lens 53 is adjusted to produce a full size image at the camera image plane 54 during the second of the two exposures. Thus the bolt hole image areas 48 are of the same size and in the same locations throughout the series of negatives.

Figure 13:
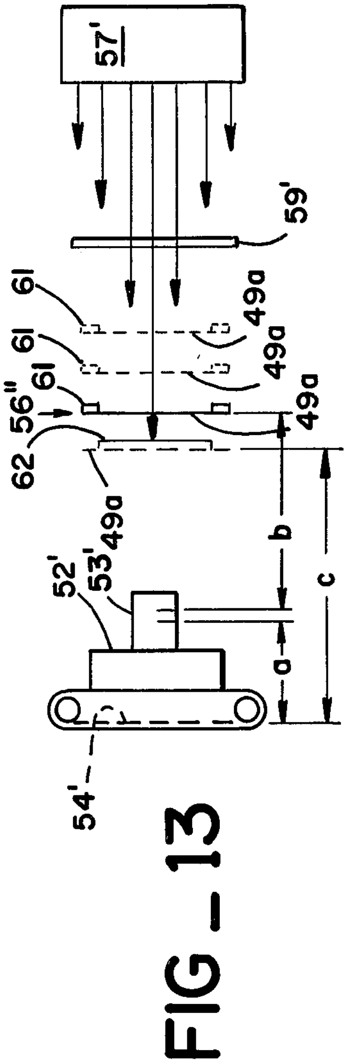
FIG. 13 is a schematic illustration of a second method for producing the negatives of FIGS. 7 to 9.

Another method for producing the series of negatives, such as negatives 49*a*, 49*b*, 49*c* of FIGS. 7 to 9, is illustrated in FIG. 13. The method again makes use of a camera 52' and a parallelizing light source 57' which directs light of uniform intensity toward the camera through a diffusing screen 59'. The camera 52' in this instance has a lens 53' which need not be of the variable focal length form. Instead, progressively greater degrees of photoreduction for the successive negatives of the series are accomplished by photographing the initial negative 49*a* at progressively greater distances from the camera.

In FIG. 13, distance (a) represents the spacing between the camera film plane 54' and the image nodal point of the lens 53' while distance (b) is the spacing of the object plane 56' from the object nodal point of lens 53'. The values of (a) and (b) are changed each time that the initial negative 49*a* is shifted further away from camera 52', to prepare a subsequent negative of the series, to assure that the image will remain sharply focused at film plane 54' and to assure that the desired degree of increased photoreduction will be realized. While this may be accomplished by a trial and error process by repetitive inspections of image sizes and sharpness, it can more advantageously be accomplished by utilizing the following relationships:

$$Da_n=(f-L)FL(n-l)/f[f-L(n-l)]$$

$$Db_n=fFL(n-l)/(f-L)[f-L(n-l)]$$

where: $Da_n$ is the change in (a) relative to the value of (a) used for the first of the series of exposures, $Db_n$ is the change in (b) relative to the value of (b) used for the first of the series of exposures, F is the focal length of lens 53' and (n) is one plus the number of preceding negatives in the series. (The initial minus sign in the expression for $Db_n$ is indicative of the fact that the change in (b) is in the opposite direction from the change in (a) as the distance of the object plane 56' from the camera is increased).

A double exposure is again made for each negative, the annular first mask 61 being positioned against the object negative 49*a* during a first exposure of each of the double exposures. Prior to the second of the two exposures, first mask 61 is removed and the second mask 62 is positioned against the object negative 49*a* which is always situated at the same distance (c) from the image plane 54' of the camera 52' during the second of the two exposures, the distance (c) being the distance at which the object negative 49*a* is imaged full size at the image plane 54' of the camera.

Figure 14:
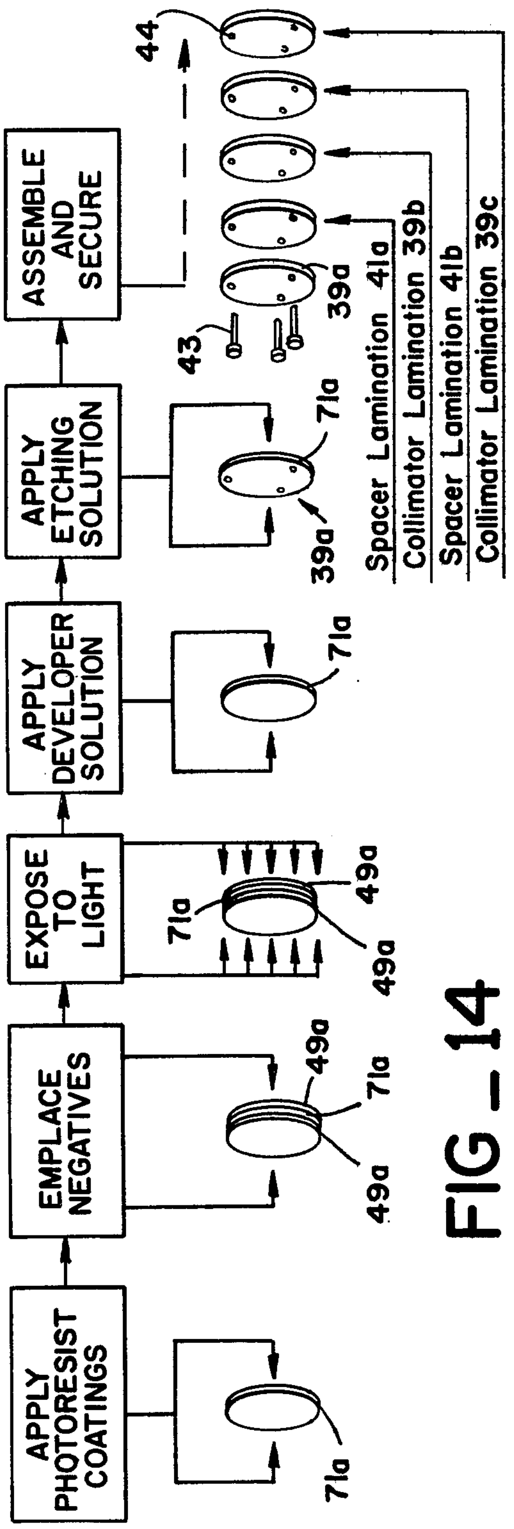
FIG. 14 is a schematic diagram illustrating one method for manufacturing the collimator of FIGS. 2 to 4.

Considering now a method for using the series of negatives such as 49*a*, 49*b* and 49*c* to produce the collimator, reference should be made to FIG. 14.

A thin coating of photoresist compound is applied, by spraying for example, to both surfaces of a collimator lamination blank 71*a*. The blank 71*a* may be a disc of lead, molybdenum, tin, copper, lead glass, uranium glass or other radiation absorbent material of a type which is dissolvable by an etching solution. The photoresist compound may be of one of the known compositions, used in the electronic microcircuit fabrication industry, which dry to a relatively thin coating on the surface to which the material is applied and which are actinically sensitive so that upon exposure to light and subsequent photographic developing, the portions of the photoresist coating which have been exposed to light remain in place on the surface while unexposed portions of the coating are removed in the developing process. KPR Photoresist, sold commercially by Eastman Kodak Company, Rochester, New York, U.S.A., is one example of a suitable compound. Procedures and process conditions for utilizing such compounds in photofabrication processes are known to the art and are described, for example, in publication No. P-246 distributed by the above identified Eastman Kodak Company.

Following application of the photoresist coatings to the two surfaces of the blank 71*a*, a matching pair of the previously described negatives 49*a* are disposed against opposite surfaces of the blank over the photoresist coating, the radiation passages image areas and bolt hole image areas of the two negatives being in alignment. Where the negatives are mirror images of each other as previously described, both negatives are placed with the emulsion side against blank 71*a*. Emplacement of the negatives is performed in the presence only of light of particular frequencies which do not affect the photoresist coating or in darkness. Good optical contact between the blank 71*a* and the negatives may be assured by establishing a vacuum between the negatives and the blank.

The blank 71*a* together with the emplaced negatives 49*a* is then exposed to light preferably from parallelizing light sources of the kind previously described. Following the exposure to light, the negatives 49*a* are revmoed and a developing solution such as trichlorethylene, for example, is applied to both surfaces of the blank 71*a*. This removes those portions of the photoresist coating, on both sides of the blank, that were not exposed to light through the negatives, the unexposed portions which are no longer coated with photoresist being the areas of the radiation passages and alignment bolt holes to be provided in the collimator lamination.

An etching solution is then applied to both surfaces of blank 71*a* by spraying or dipping, using an etchant which attacks and dissolves the metal or other material of the blank but which does not attack the photoresist coating. Thus the desired radiation passages and bolt holes are etched through the blank 71*a* to produce the initial collimating lamination 39*a*. Suitable etchants for different specific metals are known and are specified by the manufacturers of commercially available etching solutions.

The method has been described above with reference to production of the initial collimator lamination 39*a*. Similar steps are employed to produce each of the additional collimator laminations such as lamination 39*b* and lamination 39*c*. Following production of all of the collimator laminations, one of the spacer laminations, such as spacer laminations 41*a*, 41*b* is inserted between each collimator lamination and the following collimator lamination and the laminations are positioned so that the corresponding alignment bolt holes 44 of successive ones of the laminations 39 and 41 are aligned. The series of laminations are then secured together by insertion of bolts 43 into the holes 44.

Referring again to FIG. 3, checking of the assembled collimator 38 to assure that the collimating laminations 39*a* to 39*d* are in the proper order and that the radiation passages 42 of the successive collimator laminations are in proper alignment to provide the desired convergent radiation paths 22 is facilitated if the spacer laminations 41 are formed of optically transparent material such as transparent acrylic plastics for example. The assembled collimator 38 may then be placed against a broad light source for checking. If the laminations are in proper order and in proper alignment, a convergent light ray pattern, which can be observed by visual inspection, is transmitted through the collimator.

Rather than photoetching the alignment bolt holes 44 into the collimator laminations as described above, such holes may be drilled through the laminations 39 and 41 before or after assembly of the laminations to form the collimator. Computerized drilling machines suitable for this purpose are known to the art and provide alignment accuracies to within a few parts of 10,000 centering accuracy. Use of the masks 61 and 62 of FIGS. 11 and 12 and the double exposures in the preparation of the negatives as previously described may then be avoided.

The production process may be simplified when the collimator is of the nonfocusing type depicted in FIG. 5 in which all of the collimating laminations 39A to 39D are identical. Only a single pair of negatives corresponding to the initial negative 49*a* of FIG. 7 is needed as such negatives may then be repeatedly used in the method of FIG. 14 to produce all of the collimating laminations.

Plating steps, such as electroplating, vapor deposition, sputtering, or the like, may advantageously be used in certain variations of the method of manufacturing the collimator 38. For example in the process as described above with reference to FIG. 14, a relatively light substrate metal such as copper or beryllium copper, for example, may be used to form the collimator lamination blank 71*a*. After the radiation passages 42 have been photoetched through the blanks 71*a* as described above, but prior to assembly of the laminations to form the collimator 38, radiation absorbency of the collimating laminations 39 may be enhanced by plating the blanks 71*a* with a relatively heavy element such as lead or a lead-tin mixture. Electroplating or vacuum depositing plating techniques may be used for this purpose after removal of the remaining photoresist coating by application of a stripping solution of a composition appropriate to the specific photoresist compound.

Figure 15:
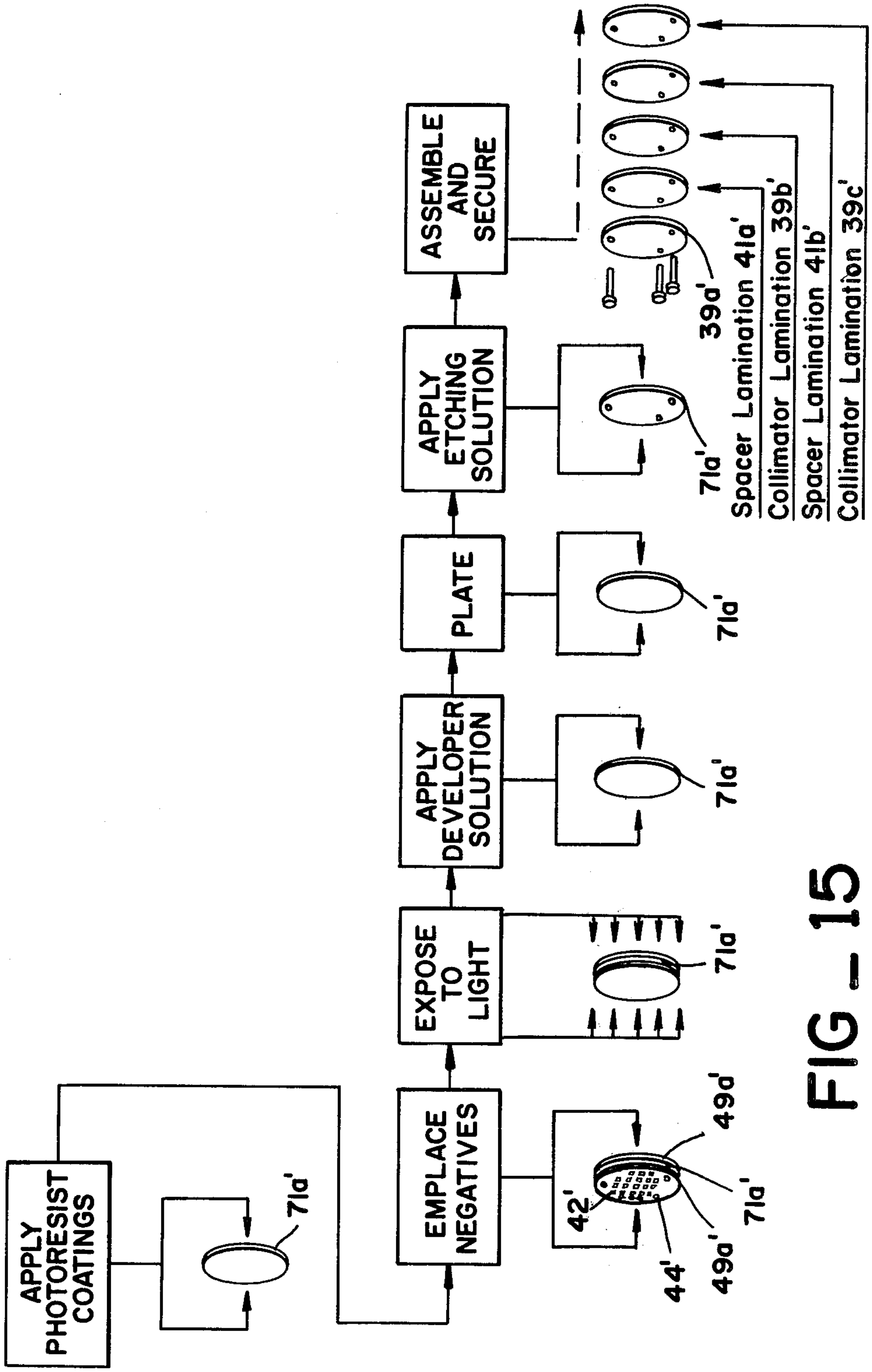
FIG. 15 is a schematic diagram illustrating another method for manufacturing the collimator of FIGS. 2 to 4.

Plating steps may also be used, prior to the etching step, to produce the radiation passages 42 in the laminations, an example of such a variation of the method being depicted in FIG. 15. The method of FIG. 15 may be similar to that previously described, with respect to the preceding figure, through the step at which the collimator blank 71*a'* is photodeveloped except that the substrate material of which the blank is formed may be radiolucent or may be a metal of relatively low radiation absorbency. The blanks 71*a'* may for example be thin sheets of solid metal such as copper or phosphor-bronze or alternately may be a substrate sheet composed of clear dimensionally stable plastic having a thin coating or copper or the like. Such substrate laminates, composed of plastics known by the tradenames Mylar or Kapton and having thin copper coatings on both sides are manufactured for use in the electronics industry. The method of FIG. 15 also differs from that of FIG. 14 in that the photographic negatives 49*a'* which are emplaced on each side of the lamination blank 71*a'* prior to exposure to light are reversal negatives relative to those used in the process of FIG. 14. Thus in the process of FIG. 15, the negatives 49*a'* have transparent areas situated in an opaque background grid to define the locations of the radiation passages 42' and bolt holes 44'. Consequently, following the photodeveloping step in the method of FIG. 15 those portions of the surfaces of the blanks 71*a'* where the radiation passages 42' are to be formed remain coated with a layer of photoresist compound but the photoresist coating has been stripped away from the other portions of the surfaces exposing bare metal.

Following the photodeveloping step, a layer of radiation absorbent material, such as lead, tin or other heavy metal for example, is plated onto the surfaces of each blank 71*a'* by electroplating or other plating techniques. The plating material adheres only to the bare metal spaces between the radiation passage 42′ areas which are still covered by the photoresist coating. Consequently, a radiopaque grid composed of the material being plated is built up on the surfaces of the blank 71*a*′. Radiotransmissiveness of the passages 42′ may then be increased by stripping away the remaining photoresist coating and etching out the underlying metal in the passage 42′ areas using etchants which attack the substrate metal but which do not attack the material which was plated onto the surfaces. The collimating laminations 39*a*′ to 39*d*′ and spacer laminations 41*a*′ to 41*c*′ may then be assembled, aligned and secured together as previously described.

One advantageous specific plating procedure for the method of FIG. 15 utilizes techniques similar to those employed in the electronic industry to produce printed circuits which typically include a plated solder layer composed of mixtures of lead and tin in any of various selectable ratios. A plating system sold under the trademark Kenvert by 3M Company, St. Paul, Minnesota, U.S.A. provides plating solutions that result in lead and tin plating deposits ranging from 100% lead to 100% tin with many intermediate alloy compositions also being available. The plating bath used to plate the lead-tin solder is usually a mixture of lead fluoborate, stannous fluoborate, fluoboric acid and additives such as peptone or gelatin to improve the grain and flow of the plating deposited on the substrate.

An advantage of the above described printed circuit plating technique in the present context results from the capability of readily plating the lead and tin alloy onto the collimator lamination blanks in any of a large number of ratios of lead to tin. In many cases, the collimator will be designed for usage with X rays of a specific energy or range of energies or a mixture of specific energies. The radiation absorbency of a specific metal or mixture of metals differs strongly for X rays of different energies. Thus the composition of the plating deposit may be selected to optimize absorbency of X rays of the particular energy or energies which the collimator is to focus. X ray absorption in the collimator depends on the X-ray energy relative to the energy absorption edges of the elements composing the collimator. For example, there is an X-ray energy region above the K-absorption edge of tin which makes tin a better absorber than lead for X rays of that energy region. Other elements or combinations of elements such as gold, copper or silver for example may also be utilized to achieve optimum X-ray absorbency in the collimator depending on the energy or wavelengths of the radiation to be absorbed.

In the method of FIG. 15, the etching step may precede the plating step if the negatives 49*a*′ used during the exposure to light are of the form used in the method of FIG. 14 rather than the reversal negatives hereinbefore described in connection with the method of FIG. 15. Negatives which are reversals of those previously described are also used in the practice of either method if the alternate type of photoresist material, which reacts to light in an opposite manner, is used. The alternate type of photoresist differs from that previously described in that during the developing step areas which were exposed to light are dissolved away while unexposed areas remain in place.

Other aspects, objects and advantages of this invention can be obtained from a study of the drawings, the disclosure and the appended claims.

I claim:

1. A radiation collimator defining a plurality of spaced apart radiation transmissive paths separated by radiation absorbent regions for suppressing intercepted radiation other than intercepted radiation which is traveling along said plurality of paths, wherein said collimator is comprised of a plurality of sheets of material each extending across said plurality of paths, each of said sheets of material being formed of a lamination of radiation transmissive material having a lamination of radiation absorbent material on at least one surface, said lamination of radiation absorbent material of each of said sheets being transpierced by a plurality of spaced apart radiation transmissive passages, corresponding ones of said passages of each of said laminations of radiation absorbent material being aligned to establish said radiation transmissive paths of said collimator.

2. A radiation collimator as defined in claim 1 further including a plurality of radiation transmissive spacer laminations, said spacer laminations being alternated with said sheets of material.

3. A radiation collimator as defined in claim 1 wherein said laminations of radiation transmissive material are transparent to light.

4. A radiation collimator as defined in claim 1 wherein said passages on each individual one of said laminations of radiation absorbent material are of uniform size and spacing and are of polygonal cross-sectional configuration.

5. A radiation collimator as defined in claim 4 wherein said passages are of rectangular cross-sectional configuration.

6. A radiation collimator as defined in claim 4 wherein said passages of successive ones of said laminations of radiation absorbent material are of progressively diminishing cross-sectional area.

7. A radiation collimator as defined in claim 4 wherein said passages of successive ones of said laminations of radiation absorbent material are spaced progressively closer together at each successive one of said laminations of radiation absorbent material causing said radiation transmissive paths to be convergent towards a focal point.

8. A radiation collimator as defined in claim 7 further including a plurality of spacer laminations alternated with said sheets of material, said spacer laminations being formed of radiation transmissive material and having a predetermined thickness selected to establish a predetermined degree of convergence of said radiation transmissive paths of said collimator.

9. A radiation collimator comprising a plurality of spaced apart collimating laminations formed at least in part of radiation absorbent material, each of said collimating laminations having an array of spaced apart radiation transmissive passages through said radiation absorbent material, corresponding passages of successive ones of said collimating laminations being aligned to define a plurality of spaced apart radiation paths through said collimator, and a plurality of spacer laminations alternated with said collimating laminations along said radiation paths, said spacer laminations being flat sheets of radiation transmissive material extending in parallel relationship with said collimating laminations and being in contact therewith.

10. A radiation collimator as defined in claim 9 wherein said passages of each of said collimating laminations are similarly spaced apart to cause said radiation paths to be parallel.

11. A radiation collimator as defined in claim 9 wherein said passages are of uniform size and spacing on each individual one of said collimating laminations, and wherein said passages of successive ones of said collimating laminations are progressively closer together to cause said radiation paths to be convergent.

12. A radiation collimator as defined in claim 11 wherein said passages of said successive ones of said collimating laminations are of progressively diminishing cross-sectional area.

* * * * *